(No Model.)

E. M. BENTLEY.
UNDERGROUND ELECTRIC WAY.

No. 302,378. Patented July 22, 1884.

ATTEST.
J. Henry Kaiser.
Geo. T. Smallwood.

INVENTOR.
Edward M. Bentley

UNITED STATES PATENT OFFICE.

EDWARD M. BENTLEY, OF BROOKLYN, NEW YORK.

UNDERGROUND ELECTRIC WAY.

SPECIFICATION forming part of Letters Patent No. 302,378, dated July 22, 1884.

Application filed December 15, 1883. (No model.)

*To all whom it may concern:*

Be it known that I, EDWARD M. BENTLEY, a citizen of the United States, residing at Brooklyn, New York, have invented certain new and useful Improvements in Underground Electric Ways, of which the following is a specification.

My invention consists in a relative arrangement between electric-light wires and single-circuit wires of any other kind by which inductive disturbance is avoided, and in a conduit for containing such wires.

Figure 1:
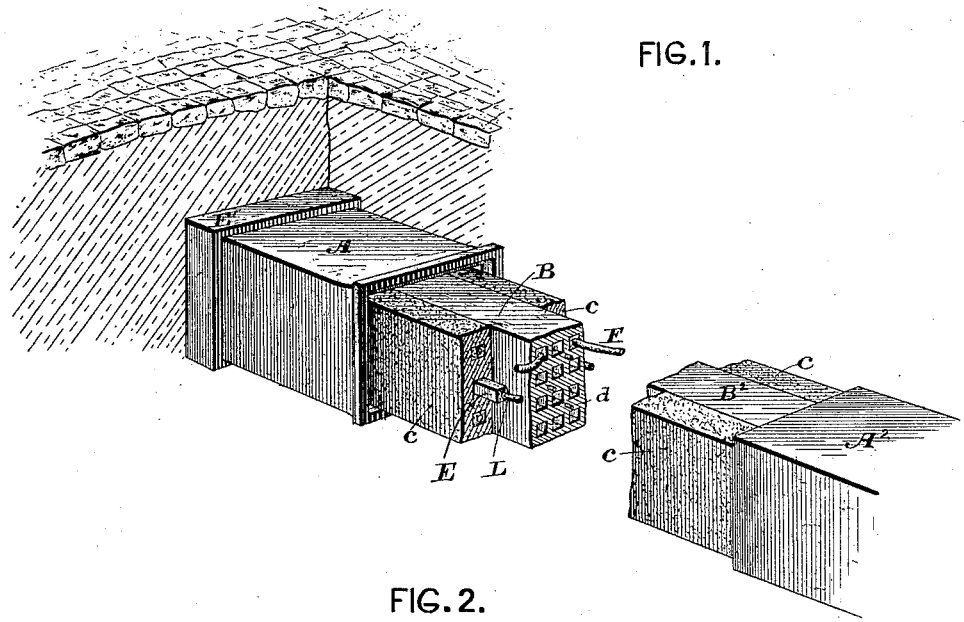
Figure 2:
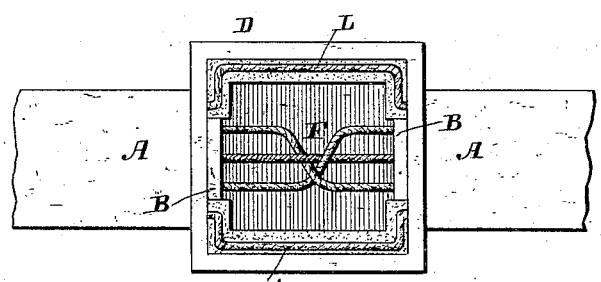
Figure 3:
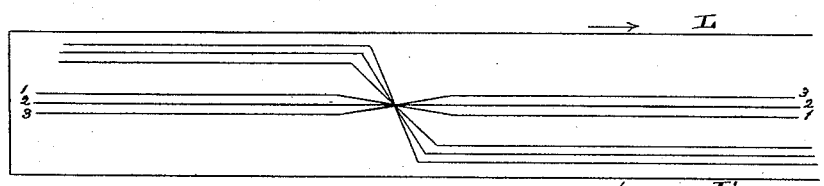
Figure 4:
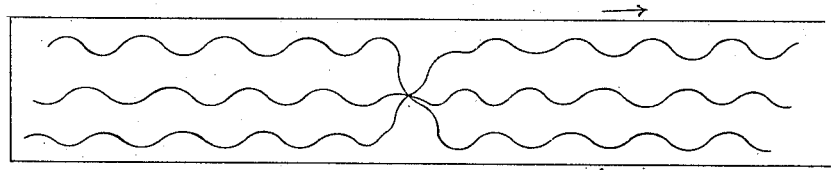

In the accompanying drawings, Figure 1 is a perspective view of my electric way. Fig. 2 is a top view of a junction-box for giving access to the wires. Figs. 3 and 4 are diagrams of the two kinds of electric circuits.

The arrangement of the circuits will be better understood by reference to patents granted to Walter H. Knight and myself on May 1, 1883. The electric-light wires are run up one side of the conduit and return down the opposite side in substantially the same horizonal plane, and in the central part of the conduit are arranged single-circuit wires in cables, the light-wires being insulated by the material of the conduit and the single-circuit wires by independent insulation applied to each wire of the cable, in the usual manner. The cables which are in the median plane will, it is evident, be exposed to equal and opposite inductive influences from the light-wires on either side, while the cables which are out of said plane will be covered over from side to side at intervals, so that the opposing induction will be made equal from each branch of the light-wires. For practical purposes this arrangement is generally sufficient, although the wires in opposite sides of the central cable are at slightly unequal distances from the light-wires, and in the side cables the wires in one section will be a little farther from the light-wire than the same wires in the same cable in the next section. This may be adjusted, if necessary, by giving each cable a half-turn at the end of each section, or by having the wires gradually twisted throughout their whole length. The former method is indicated in Fig. 3 and the latter in Fig. 4. The conduit for these wires is made of a hard glazed terra-cotta tube, A, or of a porous terra-cotta tube soaked in asphalt and inclosed in a protecting-jacket of wood, E'. Within this is an inner partitioned conduit, B, of glazed or unglazed terra-cotta, made in sections of the same length as A, but breaking joints therewith, and provided with dowel-pins $d$ or other means of alignment. On each side of conduit B are small wooden tubes E, packed in asphalt C. In construction the ends of two inner conduit-sections, B and $B^2$, are placed end to end, and then a second outer section, $A^2$, slid over it and cemented to A. The cables and light-wires are drawn into the conduit thus made in any convenient way.

Junction-boxes are placed at frequent intervals, and will be as shown in Fig. 2. D is said junction-box, the cables F being brought into it and covered over, as shown, while the light-wires L L' are placed along the opposite sides of the box and secured there by suitable insulation, as small wooden troughs with a liquid seal of tar. The wires of cables F are preferably used for telegraphic purposes, and telephone-cables are made as shown in an application of even date herewith, and drawn into any convenient opening in B.

What I claim as my invention is—

1. The combination of an underground conduit, one or more electric-light circuits therein, having their direct and return conductors on opposite sides of said conduit, respectively, and one or more independent cables in the conduit, composed each of a number of insulated single-circuit conductors, said cable or cables being placed in the central space of said conduit.

2. The combination of an underground conduit, one or more electric-light circuits having direct and return conductors on opposite sides of said conduit, respectively, and independent cables composed each of a number of insulated single-circuit conductors, said cables being placed in the central space of the conduit substantially symmetrically with respect to said light circuit or circuits, so as to be subject to opposite inductive influences from the respective conductors of the light-circuits.

3. The combination of an underground conduit, one or more electric-light circuits therein, having their direct and return conductors on opposite sides of said conduit, respectively, and one or more cables in the conduit, composed each of a number of insulated single-circuit conductors, placed substantially in the median plane at right angles to the plane of the electric-light conductors.

4. The combination of an underground conduit, one or more electric-light circuits therein, having their direct and return conductors on opposite sides of said conduit, respectively, and one or more cables in the intervening space of the conduit, each composed of a number of insulated single-circuit conductors, the lateral wires of each cable interchanging positions at intervals.

5. The combination of an underground conduit, one or more electric-light circuits therein, having their direct and return conductors on opposite sides of said conduit, respectively, and one or more cables composed of a number of wires in the intervening space of the conduit, each cable having a half-turn at intervals.

6. The combination of a conduit divided into sections, with intervening junction-boxes, electric-light and other wires therein, said other wires being insulated independently of their inclosing-conduit, and the light-wires being bare, but insulated by the surrounding conduit material, and means at the junction-boxes for preventing contact with the bare light-wires.

7. The combination of an inner and an outer conduit for electric wires, an intervening space between them filled in with plastic material, electric-light wires in said space, and insulated wires for other purposes in the interior conduit.

8. The combination of a conduit having electric-light wires on opposite sides thereof and other wires in the central part, and a junction-box wider than the conduit, the electric-light wires at said junction-box being bent outward from the line of the conduit.

9. The combination of an inner and an outer conduit, an intervening layer of plastic material, as asphaltum, tubes of insulating material embedded therein, and electric-light wires in said tubes.

Signed this 15th day of December, 1883.

EDWARD M. BENTLEY.

Witnesses:
HARRY E. KNIGHT,
GEO. S. WHEELOCK.

It is hereby certified that in Letters Patent No. 302,378, granted July 22, 1884, upon the application of Edward M. Bentley, of Brooklyn, New York, for an improvement in "Underground Electric Ways," errors appear in the printed specification requiring correction, as follows: In lines 32 and 67, page 1, the word "covered" should read *crossed;* and that the Letters Patent should be read with these corrections therein to make it conform to the record of the case in the Patent Office.

Signed, countersigned, and sealed this 29th day of July, A. D. 1884.

[SEAL.]
                                        M. L. JOSLYN,
                                        *Acting Secretary of the Interior.*

Countersigned:
    BENJ. BUTTERWORTH,
        *Commissioner of Patents.*